(12) United States Patent
Li et al.

(10) Patent No.: US 6,219,793 B1
(45) Date of Patent: *Apr. 17, 2001

(54) METHOD OF USING FINGERPRINTS TO AUTHENTICATE WIRELESS COMMUNICATIONS

(75) Inventors: Yang Li, Mountain View; D. Ramesh K. Rao, Menlo Park, both of CA (US); Subramanian Subbiah, Philadelphia, PA (US)

(73) Assignee: Hush, Inc., Menlo Park, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,024

(22) Filed: Sep. 8, 1997

Related U.S. Application Data

(60) Provisional application No. 60/025,947, filed on Sep. 11, 1996, and provisional application No. 60/025,949, filed on Sep. 11, 1996.

(51) Int. Cl.[7] ............................................. G06F 11/30
(52) U.S. Cl. ............................................. 713/202
(58) Field of Search ................................. 380/23, 25, 21, 380/59, 52, 247, 249; 713/168, 172, 186; 379/93.03

(56) References Cited

U.S. PATENT DOCUMENTS 2,952,181    9/1960   Mawer .
4,135,147  * 1/1979   Riganati et al. ..................... 382/125

(List continued on next page.)

FOREIGN PATENT DOCUMENTS 2533699    7/1975   (DE) ................................ H04Q/9/00
3610397 A1 3/1986   (DE) ................................. G06K/9/20
3743856 A1 12/1987  (DE) ................................ E05B/65/12

(List continued on next page.)

OTHER PUBLICATIONS

Field, "Curbing Today's card sharps" Computer Weekly Apr. 12, 1990. Number 1209 P 30(2).*

Nichols, ICSA Guide to Cryptography, McGraw–Hill, 1998.*

(List continued on next page.)

*Primary Examiner*—Gail Hayes
*Assistant Examiner*—James Seal
(74) *Attorney, Agent, or Firm*—Beyer Weaver & Thomas, LLP

(57) ABSTRACT

Disclosed are a system and a method employing a user's fingerprint to authenticate a wireless communication. The user's personal fingerprint is employed as the secret key in the context of a modified "challenge-response" scenario. The system includes a fingerprint capture module on a mobile personal wireless communication device (e.g., a wireless telephone) and a central authentication system coupled to a conventional mobile switching center. The central authentication system contains information that associates each mobile identification number ("MIN") with a particular user's fingerprint. When a wireless communication is to be initiated, the central authentication system engages in a challenge-response authentication with the mobile switching station or the wireless phone using the stored fingerprint associated with the MIN through the common air interface. The correct response from the mobile station will only be generated when the user's fingerprint entered through the fingerprint capture module attached to the mobile station matches the information sent from the central authentication system, and only calls placed from authorized users are connected.

43 Claims, 7 Drawing Sheets

U.S. PATENT DOCUMENTS

| | | |
|---|---|---|
| 4,151,512 | 4/1979 | Riganati et al. . |
| 4,322,163 | 3/1982 | Schiller et al. . |
| 4,537,484 | 8/1985 | Fowler et al. . |
| 4,747,147 | 5/1988 | Sparrow .................................... 382/4 |
| 4,947,442 * | 8/1990 | Tanaka et al. ........................ 382/125 |
| 5,091,942 * | 2/1992 | Dent ........................................ 380/46 |
| 5,109,427 | 4/1992 | Yang et al. .............................. 382/4 |
| 5,131,038 | 7/1992 | Puhl et al. .............................. 380/23 |
| 5,402,490 | 3/1995 | Mihm, Jr. et al. ..................... 380/21 |
| 5,420,908 | 5/1995 | Hodges et al. ......................... 379/58 |
| 5,448,760 | 9/1995 | Frederick . |
| 5,465,290 | 11/1995 | Hampton et al. . |
| 5,467,403 | 11/1995 | Fishbine et al. . |
| 5,493,621 | 2/1996 | Matsumura . |
| 5,559,504 * | 9/1996 | Itsumi et al. ...................... 379/93.03 |
| 5,583,486 * | 12/1996 | Kersten ................................ 340/568 |
| 5,680,460 * | 10/1997 | Tomko et al. .......................... 380/23 |
| 5,706,349 * | 1/1998 | Aditham et al. ........................ 380/25 |
| 5,796,832 * | 8/1998 | Kawan .................................. 713/186 |
| 5,872,834 * | 2/1999 | Teitelbaum ........................ 379/93.03 |
| 5,938,706 * | 8/1999 | Feldman ................................. 380/23 |
| 5,995,641 * | 11/1999 | Yamaguchi ........................... 382/124 |

FOREIGN PATENT DOCUMENTS

| | | | |
|---|---|---|---|
| 0304547 A2 | 4/1982 | (EP) | ................................ G07F/7/10 |
| 0348182 A2 | 12/1989 | (EP) | ................................ G06K/9/20 |
| 0348182 A3 | 12/1989 | (EP) | ................................ G06K/9/20 |
| 392 159 A2 * | 10/1990 | (EP) | ................................ G06K/9/80 |
| 0457398 A2 | 11/1991 | (EP) | ............................. G11C/27/02 |
| 0583011 A2 | 2/1994 | (EP) | ................................ G06K/9/74 |
| 0583011 A3 | 2/1994 | (EP) | ................................ G06K/9/74 |
| 04111038 | 4/1992 | (JP) | ................................ G06F/15/00 |
| 04352548 * | 12/1992 | (JP) | ................................ H04M/1/66 |
| 04358182 A3 | 12/1992 | (JP) | ................................ H04M/1/66 |
| WO96/18169 | 6/1996 | (WO) | ............................. G06K/9/00 |
| 98 32093 * | 7/1998 | (WO) | ............................. G06K/9/00 |

OTHER PUBLICATIONS

Security for Computer Networks, 2e, D. W. Davies and W. L. Price John Wiley & Sons, 1998.*

Gaffney, Jr., J.E., "Fingerprint Pattern Offset Determination and Matching Method;" pp. 773–774; Aug. 3, 1974; IBM Technical Disclosure Bulletin.

Rao, T.C., "Feature Extraction for Fingerprint Classification," pp. 181–192; Aug. 9, 1975; Pattern Recognition Letters.

"Software THeft Extends Well Beyond China," May 20, 1996, *Wall Street Journal*.

"New Chip Verifies Fingerprints," May 22, 1997, Tom Abate, *San Francisco Chronicle*.

"Embeddable Module for Fingerprint Capture and Matching," Sep. 11, 1996, D. Ramesh K. Rao, et al., U.S. Provisional Application Serial No. 60/025,949.

"A Biometric Based Method for Software Distribution," Sep. 11, 1996, Subramanian Subbiah, et al., U.S. Provisional Application, Serial No. 60/025,913.

* cited by examiner

| MIN | Challenge Key (CK) (Token) | Special Instruction | Recently Received Token |
|---|---|---|---|
| 123-456-7890 | 1783964700076 3216895567... | Block Use | 1785364700026 3336195567.... 1799972700076 3288889956... |
| 098-765-4321 | 3279648155500 14193384......... | — | — |
| 098-765-4321 | 3279648155500 14193384...... | — | — |

FIG. 2

METHOD OF USING FINGERPRINTS TO AUTHENTICATE WIRELESS COMMUNICATIONS

CROSS REFERENCED TO RELATED APPLICATIONS

This application claims priority from (1) U.S. Provisional Patent Application No. 60/025,947 filed Sep. 11, 1996, entitled METHOD OF USING FINGERPRINTS TO ELIMINATE WIRELESS PHONE FRAUD AND TO ASCERTAIN A CALLER'S IDENTITY and naming Y. Li, D. R. K. Rao, and S. Subbiah as inventors, and (2) U.S. Provisional Patent Application No. 60/025,949, filed Sep. 11, 1996, entitled EMBEDDABLE MODULE FOR FINGERPRINT CAPTURE AND MATCHING, and naming R. Rao, S. Subbiah, Y. Li, and D. Chu as inventors. Both of these applications are incorporated herein by reference in their entireties and for all purposes.

BACKGROUND OF THE INVENTION

The present invention relates to security measures for wireless telephones or cellular mobile phones. More particularly, the invention relates to authentication methods employing biometric information (e.g., fingerprints) to guarantee non-fraudulent use of wireless telephones or cellular mobile phones.

As known in the state of the art, wireless telephones or cellular mobile phones are identified by mobile identification numbers (MINs) and electronic serial numbers (ESNs). Current protocols for wireless communication, either placing or receiving a call, require both the MIN and the ESN to be broadcast through a standard common air interface (CAI) between the wireless telephone and a mobile switching center (MSC) for authorization and billing purposes. However, such information can be easily intercepted and obtained via specialized scanning equipment that is readily available. MINs and ESNs captured this way can be illegally programmed into other cellular phones for the purpose of placing calls that will be billed to the person that the MIN and ESN has been legitimately assigned to. This type of theft has become a common practice world-wide, and millions of dollars are lost to the wireless service providers and law enforcement agencies (US $650 million in 1995).

Various methods have been proposed to solve this problem. One method (described in U.S. Pat. No. 5,448,760) proposes the idea of requesting a personal identification number (PIN) each time a call is placed. The PIN can be safely transmitted through a different channel. However, this inconveniences the user and many users even forget their PINs. Another method (described in U.S. Pat. No. 5,420,908) proposes monitoring each customer's habit or calling pattern (also known as user profiles) and blocking any calls that do not fit the customer's previous calling pattern. However, such a method suffers from two problems: (1) the calling pattern of a customer is difficult to accurately pin point (any time the calling pattern changes a legitimate call might be blocked) and (2) it will not successfully block calls from phones that continually change the MIN-ESN pair that they employ.

In another method (described in U.S. Pat. No. 5,420,908 issued to Hodges and Rubenstein and incorporated herein by reference), a "challenge response" authentication scheme is proposed to solve fraudulent use in wireless communication. The proposed method includes a central authentication system serving several MSCs which store all MINs with associated secret keys that are used to generate the "challenge response" authentication. Having one central authentication system for several MSCs eliminates the need for cross-system access between different MSCs. However, for security reasons—e.g. power failure, computer hacker attacks, natural disasters—there should be at least one additional remote site that maintains a mirror copy of the central authentication system. Ideally backup communication between central authentication system and its mirror(s) allow both hot and cold backups to dynamically maintain identical copies at all times. All MSCs communicate with the central authentication platform through a standard phone line. This method also requires each wireless phone to have a device which contains special information to generate a correct response to a specific "challenge". Each time that a user uses a cellular phone, the MIN and ESN are sent to the MSC just as in the standard protocol used in wireless communication today. Then the MSC sends the information through a secure public switched telephone network (PSTN) line to the central authentication platform. The central system then takes the secret key which is associated with the MIN and generates a challenge which is sent to the cellular phone through a different wireless forward channel. The cellular phone then uses its special internal module to generate a response to the challenge which is then sent back to the MSC by wireless means and then forwarded to the central system via standard PSTN lines. The central system then compares the cellular phone's response to the pre-calculated response value it expects. If the response is correct the use is authorized.

Such a system has certain advantages and should improve security in wireless communication. Although no specific type of secret key was disclosed in the '908 patent, the specified secret keys—including a string of special integers—suffer major drawbacks. First, computer systems are always subject to intruders/hackers. For example, just recently there was the much celebrated case of Tsutomu Shimomura the network security expert and his attacker Kevin Mitnick the outlaw computer hacker (In Takedown by John Markoff and T. Shimomura, Hyperion Press: USA 1995). In the case of a break-in or even a suspicion of a break-in, all stored secret keys are rendered useless and all the keys need to be updated. This necessarily means that all the users have to visit their service provider in person and update their secret key. Second, if only one or a few keys are stolen at any given time, the system would not be able to detect the theft until the end of each billing cycle (if even then). Third, the "challenge" is MIN-specific, the thieves who capture the MIN and ESN through the air interface can also capture the "challenge" and its "response" and attempt to crack the secret key. While some encryption methods like RSA can be made very secure now, the powerful computers that can be expected to become widely available in the future may allow secret keys to be cracked with the knowledge of multiple challenges and their responses. Still further, with the global computer connectivity, Internet viruses have become a major issue and almost every week there is a new virus that is released, particularly from less developed countries. If the central authentication system gets infected and the files tampered with, as before, all users have to return to their service provider to have a new secret key reissued. All these four scenarios are quite likely to happen in our age of high-tech criminals and even-higher tech teenage pranksters.

What is needed therefore, is an improved security system to protect against unauthorized use of wireless communications. The method and associated system should provide improved security and be easy to maintain.

SUMMARY OF THE INVENTION

The current invention expands on the principles and protocols discussed above. The relevant extension involves using a token generated from biometric information, the user's personal fingerprint in particular, as the secret key in the context of a modified "challenge-response" scenario. As will be explained, this virtually eliminates all of the drawbacks discussed above. Most generally, the invention involves the use of fingerprint matching to authenticate a call or other communication over a wireless communication network. The matching may be employed at a central location on the network, at the personal wireless device, or both.

One aspect of the invention provides methods of authenticating calls to be made over a communication system. Typically, both a wireless source (e.g., a mobile telephone) and a central authentication node that may service numerous nodes participate in the methods—although each operates according to its own protocol.

An authentication method implemented on the central authentication node may be characterized by the following sequence: (a) determining that the call has been initiated from a source; (b) determining whether source fingerprint data provided from the source matches stored fingerprint data associated with the source; and (c) if the source fingerprint data matches the stored fingerprint data, allowing the call to be completed. Matching may involve separate matching steps at both the source and the central authentication node. It may also involve decrypting a challenge. In addition to the above basic steps, the authentication node may request that the source fingerprint data be provided from the source of the call. In the case of a mobile telephone system, the call initiated from the source may be forwarded through any of a plurality of mobile switching centers to reach the central authentication node. That is, the central authentication node may serve multiple switching centers. In a preferred embodiment, the central authentication node accesses the stored fingerprint data from a database that associates particular users' accounts with their fingerprints. The fingerprint data (from the source or stored database) may be embedded in a token having a format making it difficult to extract the fingerprint data. In one embodiment, that token format may be an inter-minutiae distance-vector-derived format such as one of the formats commonly employed in the art.

In one specific embodiment, the method also involves (a) encrypting a challenge with the stored fingerprint data to produce an encrypted challenge; and (b) providing the encrypted challenge to the source for the purpose of decrypting by the source with the source fingerprint data. The step of determining whether the source and stored fingerprint data match preferably involves (i) receiving a decrypted challenge from the source, which decrypted challenge had been decrypted with the source fingerprint data; and (ii) comparing the challenge with the decrypted challenge from the source. If the two match, then it is assumed that the stored and source fingerprints also match and the call is allowed to proceed.

In a particularly preferred embodiment, the method involves a further security feature to avoid use of a stolen fingerprint token. This technique operates on the assumption that each time an individual gives a fingerprint, the print is slightly different due to the flexibility of the finger skin, the angle at which the finger is pressed down, etc. Thus, it is exceedingly rare that any two finger imprints from a given user will be identical. Recognizing this, the method may require the following: (a) determining whether the source fingerprint data is identical to one or more instances of sample fingerprint data previously received; and (b) if the source and any one of the instances of the sample fingerprint data are identical, preventing the call from being completed.

Authentication methods implemented on a source such as a wireless telephone (as opposed to the central authentication center as described above) may be characterized as including the following steps: (a) transmitting a dialed number to a switching center on the communication network; (b) receiving a user's fingerprint (possibly after a prompt); (c) generating source fingerprint data from the user's fingerprint; and (d) if the source fingerprint data matches stored fingerprint data associated with user, completing the call. The source may itself determine whether the source fingerprint data matches the stored fingerprint data prior to completing the call. In the case of a wireless telephone, the method may also include traditional calling steps such as transmitting at least one of an MIN and an ESN to the switching center.

In conjunction with the encryption technique described above for the central authentication node, the source may perform the following steps: (i) receiving an encrypted challenge from the switching center; (ii) decrypting the encrypted challenge with the source fingerprint data to produce a decrypted challenge; and (iii) transmitting the decrypted challenge to the switching center, such that if the decrypted challenge is found to match an unencrypted challenge, specifying that the source fingerprint data matches the stored fingerprint data (allowing the call to proceed).

A personal wireless communication device (e.g., a wireless telephone) suitable for use with the authentication methods of this invention may be characterized as including the following features: (a) a wireless communications interface for sending and receiving wireless communications; (b) a device for capturing the user's fingerprint; and (c) a processing device (e.g., a CPU) capable of converting the user's fingerprint to source fingerprint data which can be transmitted. Preferably, the wireless device includes a casing and provided within that casing are both the device for capturing the user's fingerprint and the processing device.

The wireless communications interface should be capable of sending the source fingerprint data to a remote location. Preferably, it should be capable of sending and receiving fingerprint data over a data channel which operates at a different frequency from a communications channel which sends and receives the wireless communications.

In one embodiment, the device for capturing the user's fingerprint includes: (i) a fingerprint capture surface on which the user can place his or her finger to produce an optical image of his or her fingerprint; (ii) an imager capable of generating an electronic image of the user's fingerprint (e.g., a CCD array or CMOS photodiode/photogate array); and (iii) optics for directing the optical image of the user's fingerprint from the finger print capture surface to the imager. In a preferred embodiment, the imager is a CMOS photodiode/photogate array which is provided on an integrated circuit together with the processing device. In an alternative embodiment, the device for capturing the user's fingerprint includes an imager which does not require optics. Examples of such "optics-free" imagers include capacitor arrays or ultrasonic mechanisms formed on semiconductor substrates.

The processing device should contain the logic and resources necessary for comparing the source fingerprint data with stored fingerprint data received from a remote location. Preferably, the processing device should also be capable of decrypting a challenge received from the remote location.

As noted, the biometric "challenge-response" authentication scheme of this invention preferably employs a central authentication platform serving several or all MSCs and wireless phones. In this manner, the current invention seeks to prevent fraudulently placed wireless calls using stolen MIN-ESN information.

Another aspect of the invention provides a central authentication system or node connected to a communications network and capable of rendering wireless communications secure by processing biometric information from a user. Such central authentication systems may be characterized as including (a) a communications interface for sending and receiving data communications over the communications network; (b) a database interface for accessing a database containing stored fingerprint data associated with users of wireless communications devices; and (c) a processor capable of determining whether a wireless communication from a wireless communications device should be permitted based upon a match between a fingerprint taken from the wireless communications device and stored fingerprint data associated the wireless communications device.

Often the communications interface will be coupled to a public switched telephone network such that the data communications are directed to one or more mobile switching centers on the network. The database—which may form part of the central authentication system—preferably includes, for at least some of the wireless communications devices, a plurality of received tokens containing information from fingerprints taken at the wireless communications devices. The system then compares newly received tokens from a given wireless communication device with the plurality of tokens for that wireless communications device.

These and other features and advantages of the present invention will be further described below with reference to the associated drawings.

BRIEF DESCRIPTION OF THE DRAWINGS

FIG. 2 is a representation of a MIN-challenge key database table used to store tokens from biometric information in accordance with one preferred embodiment of this invention.

DETAILED DESCRIPTION OF THE PREFERRED EMBODIMENTS

The present invention is described herein in terms of a wireless telephone system. The invention is not so limited. For all purposes of this current invention, the term "wireless telephone" (or "wireless communication system") generically will be understood to include cellular phones, personal communication systems, telephones, personal digital assistants, wireless personal computers, wireless notebooks, etc. using analogue or digital electronics technology. While the present invention is currently envisioned as providing substantial benefit to wireless communications, there is in principle no reason why it could not be applied to communications generally. Any communication that could benefit from authentication may be implemented with the present invention. Such communications include those made over a wire-based telephone system and employing an account code.

The communications allowed over the communication system will sometimes be referred to herein as "calls." Examples of communications (calls) within the context of this invention include (a) analog transmissions such as telephone calls transmitting analog voice data over a wire medium or a wireless medium and (b) digital transmissions such as packetized messages over a network (LAN, WAN, Internet, etc.) and digital voice data over a wireless medium. Communications involving packetized transmissions may be connection-based transmissions such as TCP or connectionless transmissions such as UDP.

Fingerprint technology including hardware image capture, software image processing, software/hardware for fingerprint data storage and software for fingerprint analysis/comparison is a relatively mature technology with over 20 years of development (see, for example, U.S. Pat. Nos. 2,952,181, 4,151,512, 4,322,163, 4,537,484, 4,747,147, 5,467,403, each of which is incorporated herein by reference for all purposes). It is well-known that no two individuals possess the same identical fingerprint and that accurate matching techniques in conjunction with well-captured images can positively identify an individual. The term "fingerprint" as used herein refers to handprints, palmprints, and other unique skin patterns in addition to traditional fingerprints.

The present invention may employ sophisticated hardware and software to allow rapid fingerprint based identification as described in U.S. Provisional Application No. 60/025,949, filed on Sep. 11, 1996, naming R. Rao, S. Subbiah, Y. Li & D. Chu as inventors, and previously incorporated by reference. That application describes an extremely small, low-cost fingerprint capture hardware module that lends itself to ready insertion into many devices. The referenced Provisional Application was incorporated herein by reference for all purposes and is illustrative of the maturity of the fingerprint capture and comparison technology.

Figure 1:
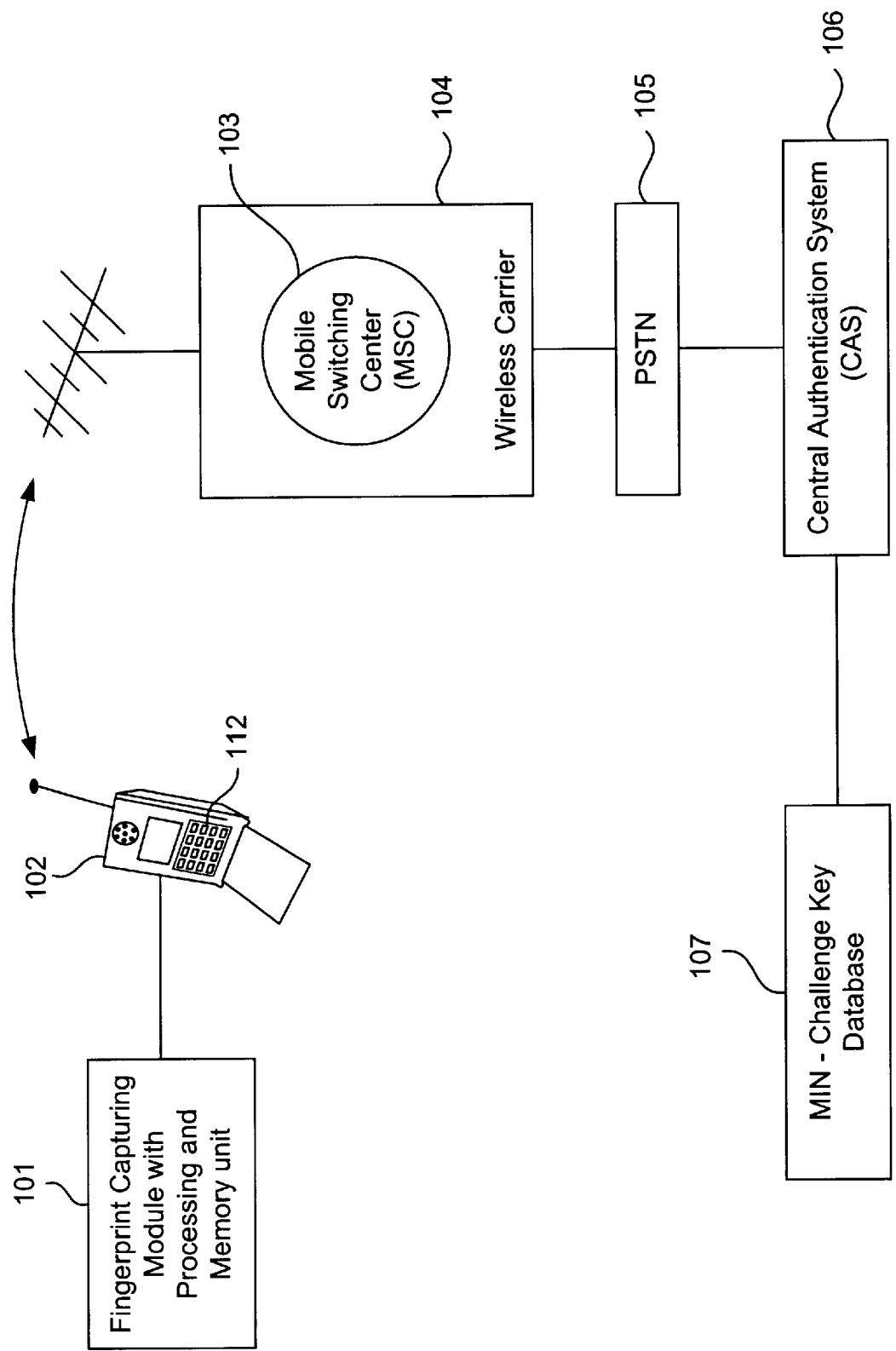
FIG. 1 is a block diagram of various components of the present invention as it may be employed in a cellular phone system.

FIG. 1 shows an apparatus that may be used to process a wireless call in accordance with the principles of the current invention. A fingerprint capturing device ("FCPD") 101 (such as that described in U.S. Provisional Application No. 60/025,949, previously incorporated by reference) with an on-board CPU for processing and comparison of the captured fingerprint image (see FIG. 4) is connected to the wireless telephone 102. This connection may be by any method, i.e. via a telephone modem or a data port specifically built-in to the wireless telephone 102, an acoustic coupler, or the direct incorporation of the fingerprint module 101 into the wireless telephone 102. Preferably, the module 101 can be incorporated within telephone 102 such that a standard mobile telephone casing may house all electronics for operation of the telephone and fingerprint processing. In an especially preferred embodiment, the electronics for processing both the fingerprints and the telephone calls are provided on a single integrated circuit chip. This makes it especially difficult to tamper with the system by, for example, intercepting signals between fingerprint capturing module 101 and telephone 102.

In one embodiment of the invention which employs a protocol similar to that of conventional wireless systems, each phone is provided with a MIN and ESN. When the user dials a telephone number using a keypad 112 on the wireless telephone 102, the MIN, ESN, and the number of the party being called is transmitted to a Mobile Switching Center (MSC) 103 of a wireless carrier 104. In response, MSC 103 performs the standard verification of the MIN and ESN as well-known in the art (see for example, In Wireless Communications, by T. S. Rappaport, 1996, Prentice-Hall which is incorporated herein by reference for all purposes). If the MIN and ESN belong to a special group of users who have previously requested the additional layer of fingerprint based security with their service, the MIN and ESN are sent to a Central Authentication System (CAS) 106 via a public switched telephone network (PSTN) or Internet 105 to avoid direct access of CAS 106 through the air interface. This provides additional security for the CAS.

In response to the MIN being forwarded by MSC 103, CAS 106 looks up its built-in MIN-Challenge Key Database (MCKD) 107 and retrieves an appropriate Challenge Key (CK 202, FIG. 2) that is associated with that particular MIN. The CK 202 is a token that has been derived from the user's fingerprint when the user first registered the purchase of his/her phone service. The CK 202 is then used to encrypt a "challenge" that is generated by the CAS 106. The challenge that is formulated by the CAS 106 is different each time when it is accessed by the same or different users. The CK 202 and the encrypted challenge are then jointly sent to wireless telephone 102 through any available forward voice channel (FVC) or forward control channel (FCC) for example.

Figure 4:
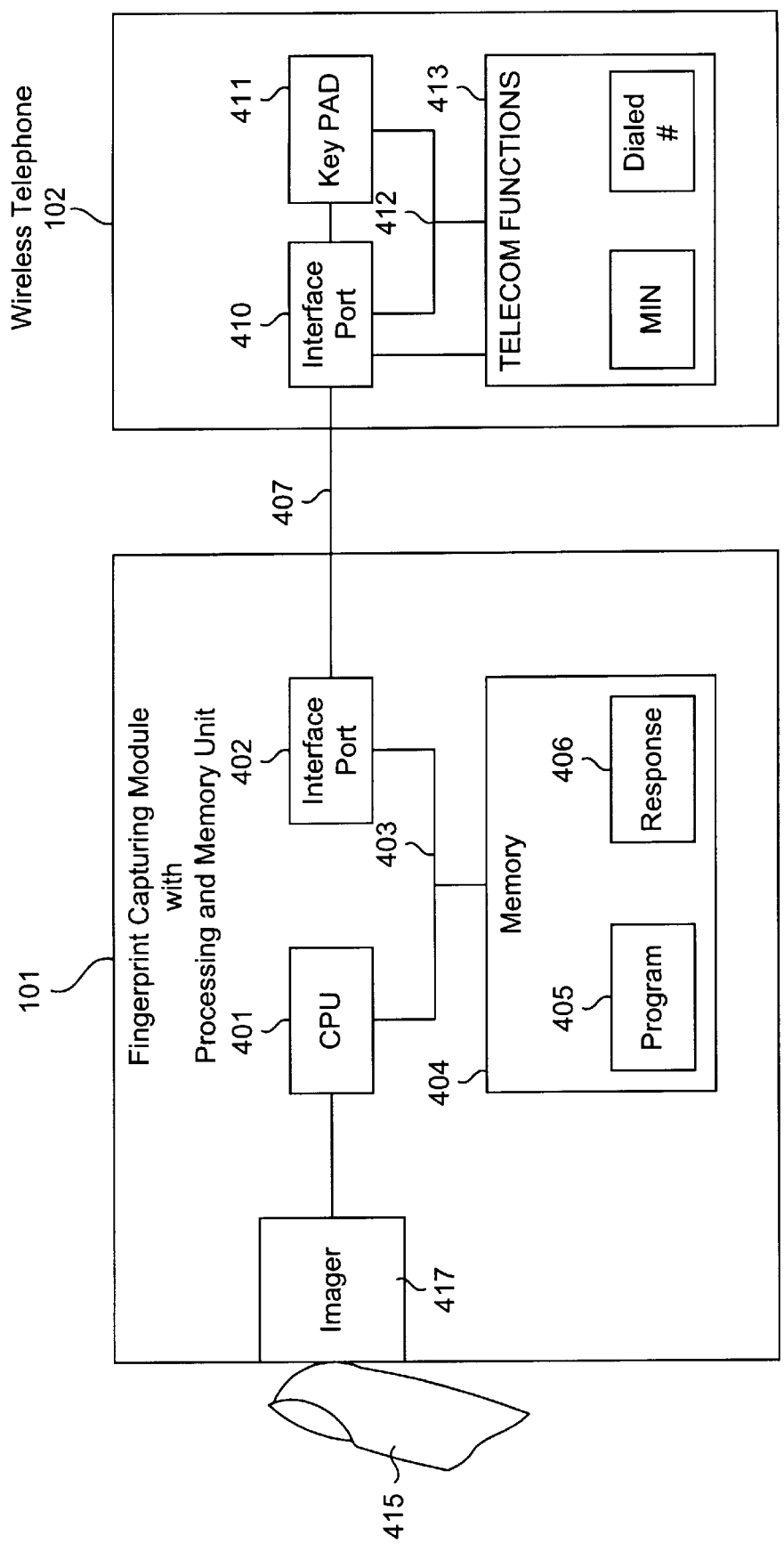
FIG. 4 is a block diagram depicting basic components of a fingerprint capturing unit and an associated wireless telephone in accordance with a preferred embodiment of the present invention.

After reception of the challenge from CAS 106 by wireless telephone 102, the challenge is forwarded to FCPD 101 as detailed in FIG. 4. The user's fingerprint information could have been requested by FCPD 101 either before this point and after the user entered the number of the called party, or at this time point itself. A token, which in one embodiment could simply be an encoded collection of a set of unique minutiae/features found in the fingerprint, is then generated based on the fingerprint information captured locally by FCPD 101. As well-known in the art of fingerprint matching, a fingerprint from any individual is unique to that individual and therefore the variety of slightly different tokens (tokens can differ by a feature or two without any loss in uniqueness) that can be generated can only come from that individual. This is then compared with fingerprint-based token CK 202 that was received from CAS 106. If there is a match of the tokens, the encrypted message is decrypted by using token CK 202 received from CAS 106. In other embodiments, either or both tokens could be used to decrypt the challenge. A response (the decrypted challenge) is then sent back to MSC 103 through any of the available reverse voice channels (RVCs) or reverse control channels (RCCs). This is then forwarded via PSTN or Internet 105 (for additional security one may limit use of the common air interface as much as possible) back to CAS 106.

The response from FCPD 101 to CAS 106 contains both the decrypted message and a token that is generated from the fingerprint image the user supplied. If (1) the received decrypted message matches the expected response (i.e., the original unencrypted challenge that had been temporarily stored in CAS 106, as detailed in FIG. 6) and (2) the token received from the FCPD 101 matches the CK 202 in the MCKD 107, the call is authorized and connected. This double matching method will reduce false positives. It will also prevent any illegal attempt that relies only on a decryption of just the encoded challenge.

It is important to note that tokens generated from the same finger vary every time the fingerprint is captured. In a preferred embodiment, if the token sent from FCPD 101 (via wireless telephone 102) is identical to that in the database (CK 202) the call will not be authorized, since it is extremely unlikely that the exact same token will be generated in subsequent image capture of the same finger. Presumably, such exact token matching will only happen if the token had been illegally captured and is being used for illegal access into the phone network. In this embodiment, the database may store up to a pre-specified number of tokens sent by user from wireless telephone 102. If the most current token sent from the user is identical to any token from this list, the call is also blocked, since this may indicate the interception of a particular token sent from user to CAS 106 and used illegally. This is a major advantage of the current invention since the token CK 202 used for encryption (in other words the secret key that is central to all 'challenge-response' authentication methods) can itself be broadcast over the common air interface or even made public. Thus the secret aspect of system described in the above-referenced Hodges and Rubenstein patent may be avoided in one embodiment. To reiterate, by blocking exact matches between a newly generated token and a stored token (one embodiment of this invention), the illegal capture of the token CK 202 does not enable third-parties to fraudulently initiate calls. This is a clear and substantial advantage over the prior art, and derives from the fact that personal biometric information is being used to generate secret keys.

A further advantage is the token's resistance to corruption due to wireless noise. In one embodiment, a loss of a few features of the minutiae set from the token will still leave sufficient uncorrupted features to allow unique matching against another token derived from the same finger. One could therefore expect a "fuzzy" (non-deterministic) set of minutiae, that will give unique matching. Another advantage of the current invention, derives from the fact that the CK 202 tokens can be made public with no ill effects. Thus if the database MCKD 107 is stolen or attacked by computer hackers and viruses, as long as a backup copy of the database MCKD 107 exists at a remote and secure mirror-site, there is no lasting negative consequence (so long as exact matches with prior stored tokens require that a call be blocked).

FIG. 2 shows a typical structure for the MIN-Challenge Key Database 107 ("MCKD") in accordance with one embodiment of this invention. A CK 202 is stored in association with each MIN 201. Additional instructions or restrictions on the use of each MIN 201 can be stored in a special instruction section (SIS) 203. These may include, for example, blocks on long distance calls to certain localities, restrictions on calls over a certain dollar amount, etc. In addition, MCKD 107 includes a column 204 for storing recently received tokens from FCPD 101. Anytime that a received token exactly matches one of the tokens stored in column 204, the call may be blocked.

The CK 202 is a token that is generated from the fingerprint that the user initially provided when registering with the phone company. This token contains information pertinent to the fingerprint minutiae information that has been embedded so as to ensure that if stolen it would not lead to a loss of the original fingerprint itself.

Since fingerprint images vary slightly from print to print, such tokens from the same finger at repeated times will be different. Also, depending upon the format of fingerprint minutiae in the tokens, two separately generated tokens of the same print will not from the outside appear similar— only when fingerprint matching algorithms for comparison are applied to both tokens generated from different impressions of the same finger can both tokens be deemed to be from the same fingerprint. Thus simple possession of a token from a given fingerprint will not enable anyone to generate other different tokens corresponding to a different fingerprint impression from the same finger. This renders the method very robust and tamper proof.

Token matching first requires extraction of the fingerprint minutiae from the token. These are then compared by matching their two-dimensional coordinates. If the coordinates match to within a defined tolerance, the tokens are deemed a match. As explained below, tokens may be provided with a timestamp as an extra security measure.

As known in the state of the art, many fingerprint matching schemes involve the generation of inter-minutiae-based keys (i.e., distance vectors, etc.) that while being generally similar, will vary between multiple impressions of the same finger. Various inter-minutiae distance-vector-derived formats are known in the art. Many of these (as well as variations on them) may be suitable for generating keys in accordance with this invention. Such keys may, of course, also serve as tokens such as CK 202 in this invention. Suitable matching schemes are described in, for example, U.S. Pat. No. 4,747,147 issued to Sparrow on May 24, 1988, U.S. Pat. No. 5,493,621 issued to Matsumura on Feb. 20, 1996, and information provided at the World Wide Web site www.Lucent.Com/Press/0597/minu1.GAF. Each of these documents is incorporated herein by reference for all purposes. A typical description of a processed fingerprint is a list of x, y and angle tabulation of each minutia. Minor modification to these linear values (e.g., adding slight random displacements) will still reflect the same underlying fingerprint, allowing for variation during multiple impressions (e.g., slight distortions and rolling during the pressing of the finger). Thus, using straightforward minutiae tabulations as tokens is susceptible to minor modification that could result in illegal phone access.

A different and frequently used description of fingerprint information is the interminutiae distance vector information. Such descriptions are inherently non-linear in nature and so when tabulations of these are randomly or systematically modified (i.e. without explicit knowledge of the inherent non-linearity) in minor and linear ways, the new modified tabulation will not, in general, reflect the underlying original fingerprint, even when allowing for variation between multiple impressions of the same fingerprint.

Thus, use of such inter-minutiae distance-vector-derived keys (tokens) for matching purposes will foil wireless fraudsters who may somehow illegally capture the transmitted and encrypted fingerprint information and try to use the exact same keys to fraudulently activate phone calls. That is, in general legal phone use, one expects the transmitted fingerprint keys to be somewhat different each time, and different in a way that makes sense with respect to the fingerprint. In illegal use, where the encrypted keys are captured, decrypted and re-transmitted, the repeated use of a set of exact same identical keys can be readily detected. Any minor modification of the keys, without specific prior knowledge of non-linear relationships in order to be true has to be compatible with the true fingerprint and thus leading to the detection of such fraudulent use.

The advantages of using a central authentication platform and a "challenge-response" authentication method are described in U.S. Pat. No. 5,420,908 described above. However, the "challenge-response" authentication suggested in that patent differs significantly from the current invention in at least two ways: First, the patent suggests a shared secret key (S-key) between the wireless phone and the central authentication system. This necessarily requires a specialized memory chip that can store the S-key to be part of the wireless phone itself. Therefore, in the event that the wireless phone is lost or stolen, illegal calls can be made from the phone unless special instructions to block such newly illegal calls have been sent to the central authentication system. The current invention, in contrast, relies on information that is stored at the user's fingertips itself, and therefore does not require the wireless phone unit itself to store any secret key/information. Consequently, a stolen or lost phone cannot be used illegally. Second, the challenge-response method described in the '908 patent does not transmit the S-key itself over the air interface. The present invention may allow transmission of the "secret" key through the air interface; because the present challenge-response authentication scheme is not dependent on the "secret" key per se. In a preferred embodiment, however, the key (CK 202) is kept secret by some acceptable technique such as sending the challenge and response over variable channels unrelated to the voice transmission and/or providing additional encryption of the keys themselves.

By using personal biometric information, like fingerprints, the present invention may overcome the major drawbacks of the generic "challenge-response" authentication schemes as typified by the '908 patent method.

Figure 3A:
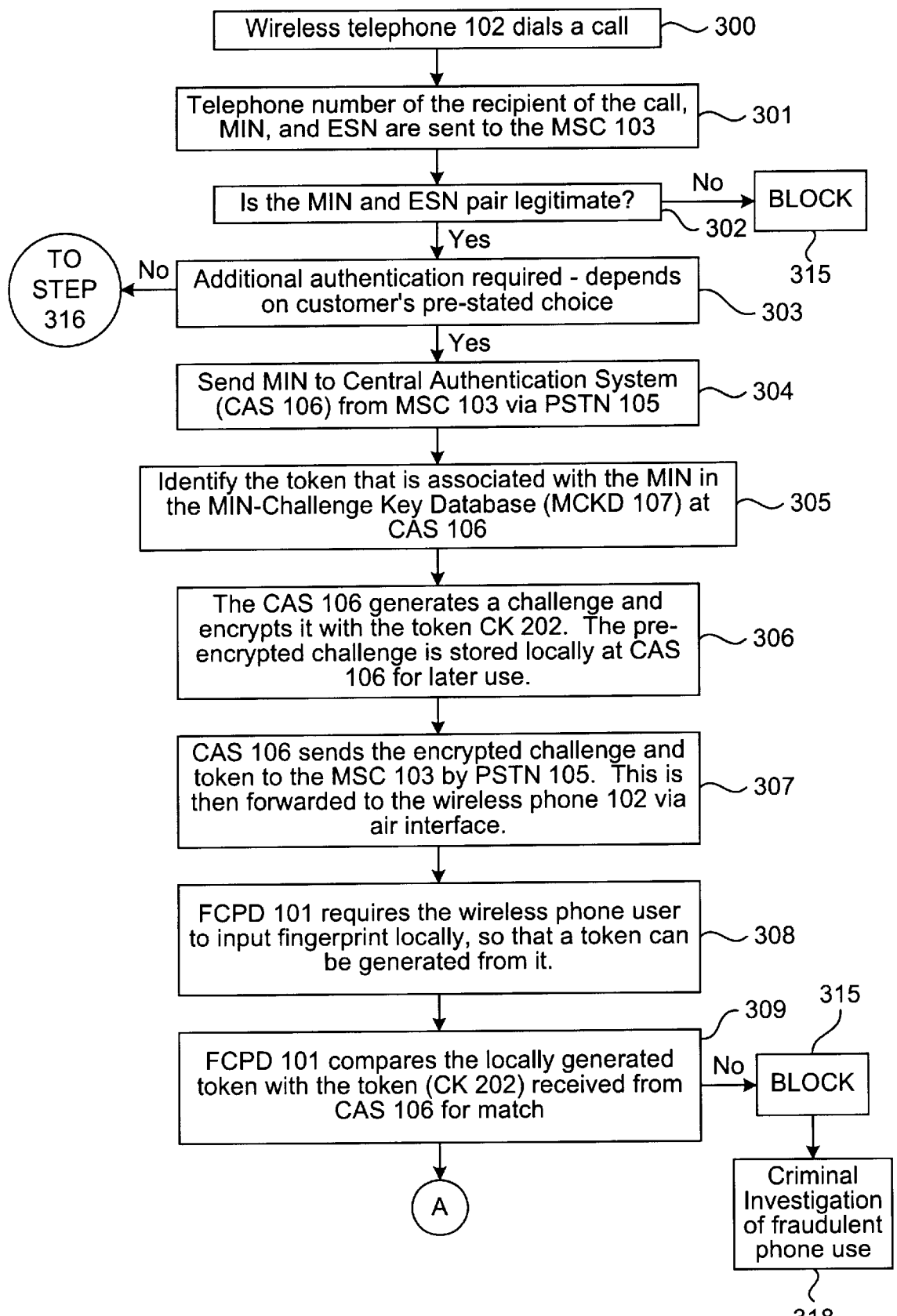
FIGS. 3A and 3B together present a process flow diagram depicting a sequence of events in a challenge-response authentication method of the present invention.
Figure 3B:
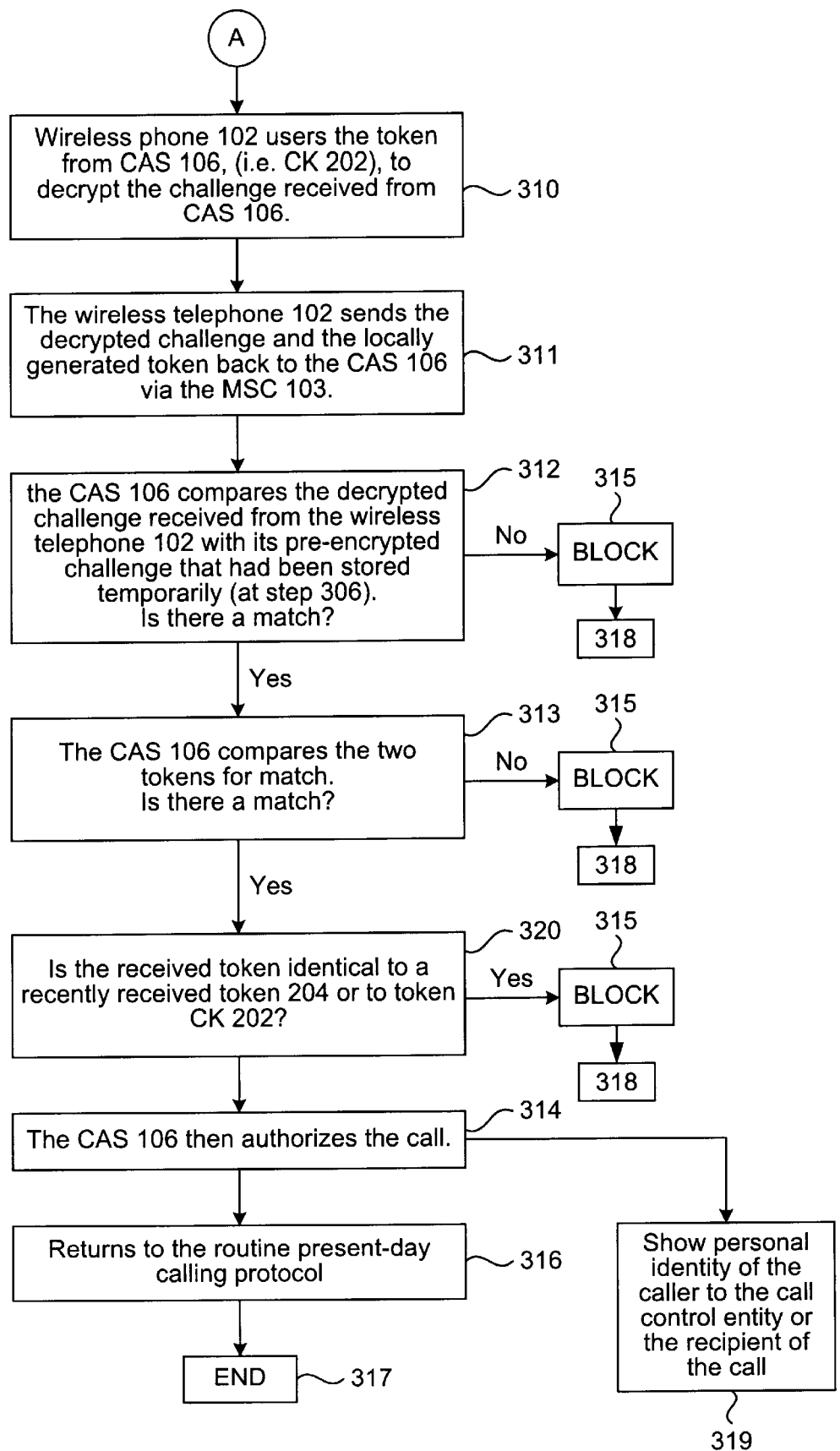

FIGS. 3A and 3B present a flow chart of one typical sequence of events in a "challenge-response" authentication of this invention. The user begins the process at a step 300 by dialing a telephone number using the keypad 112 of the wireless telephone 102. The MIN, ESN, and the phone number of the party being called are transmitted to MSC 103 at a step 301. At a branch point 302, as in a conventional system, MSC 103 either confirms the legitimacy of the MIN-ESN pair and goes to a next step 303, or blocks the call at a step 315. At a branch point 303, the MSC determines if the user of the MIN requested additional security. If the result is NO, the call is connected just as routinely done in a conventional system at a step 316. If the result is YES, the MIN is sent to the CAS 106 at a step 304.

In a step 305, CAS 106 accesses MCKD 107 and requests token CK 202 that is associated with the MIN. CAS 106 then generates a challenge that is different each time. This is then encrypted with the token 202 in a step 306. The CAS 106 sends token CK 202 and the encrypted challenge to the wireless telephone via a step 307 using PSTN or Internet 105. Additional layers of security can be added to the encrypted challenge and CK 202 if so desired. For example, the encrypted challenge can be sent to the mobile wireless phone over a different wireless forward channel.

In a step 308, the user gives his/her fingerprint to the FCPD 101 and this is used to generate token. In certain variations, step 308 can be performed at any point after step 301 and the generated token stored in a memory 404 (FIG. 4). After the encrypted challenge has been sent to phone 102 and a token has been generated from the user's fingerprint, FCPD 101 compares the generated token with the token it received from the CAS 106 at a conditional branch point 309. If they do not match, the call is blocked at a step 315. In one embodiment, whenever a call is blocked the token sent by FCPD 101 of the caller's fingerprint can be forwarded via MSC 103 through CAS 106 and specially stored for later criminal investigation of fraudulent phone use (step 318). If they match, the token received from CAS 106, or in other embodiments both tokens (including the one generated at the phone), is used to decrypt the challenge sent from CAS 106 in a step 310 (begin FIG. 3B). The FCPD 101 then sends both the now-decrypted challenge and the locally generated token (from the user's fingerprint captured on FCPD 101) back to CAS 106 by way of MSC 103 via a step 311.

Generally, the invention's direct mapping of individuals personally to the phone calls they make also allows the mapping of callers who attempt unsuccessful break-ins into the wireless phone system. Permanent records of the tokens generated from the fingerprints of callers attempting illegal entry can be kept, if desired, for further criminal investigation. More importantly, the mere idea of the potential of being caught when illegally using someone else's phone may greatly reduce phone fraud.

After receiving the decrypted challenge from FCPD 101, CAS 106 compares it with the challenge stored in a CAS temporary memory 607 (FIG. 6) at a conditional branch point 312. If the match is not successful the result from step 312 is NO and the call is blocked at a step 315 and then step 318 may be permitted if so desired. If there is a match the result is YES and the process moves on to a conditional step 313. At this step, CAS 106 compares the token generated from the user's fingerprint captured and sent by FCPD 101 to one or more stored in its database 107 at column 202. If these tokens do not match, the call is blocked, again at step 315 and step 318 is optionally performed. This second matching of the tokens (note that they were initially compared at step 309) is provided for additional security and may be dispensed with if desired.

Next, at an optional decision step 320, CAS 106 compares the token received from FCPD 101 with one or more stored tokens which were previously received from FCPD 101 and CK 202. These previously received tokens are preferably those stored in column 204 of database table 107. If it is found that the most recently received token exactly matches one of the tokens stored in columns 202 and 204 of database 107, the call is blocked at step 315 (and step 318 is optionally performed). As noted above, tokens are generally not identical if they capture a fingerprint with sufficient resolution because each fingerprint from a given individual will vary slightly (e.g., the minutiae may be slightly offset from one another). To ensure authentication in the case where a given individual actually does give two identical legitimate tokens, the system may only block the call if two or more successive tokens exactly match one or more of the stored tokens.

If the tokens match at step 313 but not identically (optional step 320), the call is authenticated for connection at a step 314. Thereafter, at a step 316, the process returns to the routine present-day calling protocol to complete the connection. If needed, allowance for failed authentication due to severe token corruption from wireless noise etc., can be made by having the protocol automatically re-try the entire procedure at step 304. The entire process exits at a step 317 and ends the illustrated flow-diagram.

In a further preferred embodiment, the format of the embedded fingerprint minutiae contains a timestamp specifying the time at which the user's fingerprint was taken. The CAS would then deny access if the timestamp was not from an appropriate window in time (chosen to allow for a reasonable delay between transmission of the challenge and receipt of the newly generated fingerprint token). If a person should intercept the user's fingerprint token, not only would he/she have to extract the fingerprint minutiae, but he/she would also have to properly update the timestamp in order defeat the system. In some embodiments, the CAS only checks for timestamp, rather than examining the newly received token for an exact match to some multiple previously received tokens.

FIG. 4 is a diagram presenting one embodiment of the FCPD 101 and its interconnection with the wireless telephone 102 (FIG. 1). The illustrated FCPD 101 contains a fingerprint imager 417 for converting a fingerprint from a finger 415 into an a finger print image. FCPD 101 also includes a CPU (central processing unit) 401 that can supply all the computational needs of the "challenge-response" authentication process, and more importantly all necessary processing of fingerprint images and their subsequent comparison. An interface port 402 and a data bus line 403 are together capable of handling all the communications between various parts of FCPD 101 and wireless telephone 102. This includes all types of serial interfaces and voice channels for transmitting and receiving data. A memory module 404 stores at least those items necessary to the operation of FCPD 101 including: 1) a software program 405 which contains program codes for fingerprint image processing, matching, decryption of the challenge, and the generation of responses; and 2) a response storage unit 406 which temporarily stores the response before sending it to the CAS 106.

CPU 401 can be any suitable integrated circuit or electronic design including multichip modules and circuitry formed on printed circuit boards. If it is an integrated circuit, it may a general purpose microprocessor, a logic device such as an application specific integrated circuit (ASIC), etc. Examples of suitable ASICs include gate arrays, simple and complex programmable logic devices (PLDs), digital signal processors (DSPs), and field programmable gate arrays (FPGAs).

In one embodiment, fingerprint imager 417 includes a fingerprint capture surface such as a window or capacitor array which produces an image of the user's fingerprint when the user places his or her finger thereon. In addition, imager 417 includes the optics necessary direct an optical image of the fingerprint onto a solid state imager which also forms part of fingerprint imager. The solid state imager, which is preferably a CCD array or a CMOS photodiode/photogate array, generates an electronic image of the user's fingerprint. If the solid state imager is a CMOS photodiode/photogate array, it may be provided on single integrated circuit together with processing logic such as CPU 401. Further details of suitable optical fingerprint imagers are provided in U.S. Provisional Application No. 60/025,949, "Embeddable Module for Fingerprint Capture and Matching," filed on Sep. 11, 1996, and naming R. Rao, S. Subbiah, Y. Li & D. Chu as inventors. In an alternative embodiment, imager 417 may be a capacitor array formed on a semiconductor substrate such as that described in the May 22, 1997 edition of the San Francisco Chronicle, "New Chip Verifies Fingerprints" which pertains to a product of Veridicom Corporation. In another alternative embodiment, imager 417 may be an ultrasonic mechanism formed on semiconductor substrates.

It is important to note here an advantage over the "challenge-response" authentication method presented in U.S. Pat. No. 5,420,908 (referred to as the Secret-Key). In the present invention, "key" need not be persistently stored in the FCPD 101 module. Therefore the wireless telephone cannot be used by any other user even when it is lost or stolen.

In a preferred embodiment, telephone 102 is a conventional wireless telephone. It communicates with FCPD 101 over a connection line 407 which may be a parallel or serial connection. Telephone 102 may contain a key pad 411, all necessary telecommunication functions 413 (including a stored MIN and provisions for generating a dialed number from key pad inputs), data bus lines 412, and an interface port 410 for communicating with FCPD 101 (over connection line 407) and with wireless stations such as an MSC. It is important to note that interface port 410 should be capable of interfacing not only voice communication signals (for standard mobile phone operation), but other communication for control between the CAS 106 and the FCPD 101 to complete the "challenge-response" authentication. In a preferred embodiment, interface port 410 is capable of sending and receiving fingerprint data over a data channel which operates at a different frequency from a communications channel which sends and receives the wireless communications (e.g., voice data).

Preferably, FCPD 101 is integrated directly within the casing of a conventional wireless telephone or other communication source. The only distinction being the presence of a fingerprint capture window on the side of the telephone and accessing imager 417. In an especially preferred embodiment, a single integrated circuit provides most of the functions of FCPD 101 and telephone 102. These functions include, for example, CPU 401, memory 404, and telecom functions 413. As functions from both FCPD 101 and telephone 102 are provided on the same chip, interface port 402 and connection line 407 are not required. A modified version of interface port 410 having only the functionality necessary to communicate with other wireless stations (not FCPD 101) may be employed on the integrated circuit. This single chip embodiment has the advantage an extra layer of security as thieves will be unable to directly monitor signals crossing connection line 407.

If fingerprint imager 417 is a CMOS imager, it may integrated with other components on the integrated circuit. If imager 417 is a CCD array, it typically will have to be provided on a separate chip.

Suitable design parameters of FCPD 101 can be specified based upon the general requirements of fingerprint analysis and matching algorithms. A typical human fingerprint has an aspect ratio of about three to two; that is, it is one-half times as long as it is wide. The average fingerprint has about 50 ridgelines separated by intervening valley lines that are about equally as thick. Generally the lines run from left to right and as they do they first traverse upwards and later downwards. Given this amount of information, the Federal Bureau of Investigation has suggested that fingerprint detection systems should provide an array of 512×512 pixels since it allows for at least four pixels per ridgeline and four per valley line. Preferably, though not necessarily, the imager employed in the FCPD 101 contains an array of at least 512×512 pixels. Using sophisticated fingerprint imaging algorithms such as those described in the above-referenced US Provisional Application 60//025,949, significantly smaller arrays can be employed. In one embodiment, the array may include 240×160 pixels or, in anther embodiment, 120×160 pixels. The use of such small arrays has the advantage of requiring (1) less processing resources from CPU 401 and (2) less space from memory 404 during processing of a large array of fingerprint data.

Accurate fingerprint matching technology, which is well-known in the art (see, for example, U.S. Pat. No. 2,952,181, 4,151,512, 4,322,163, 4,537,484, 4,747,147, 5,467,403 which were previously incorporated by reference), has for over a hundred years relied on the extraction and subsequent comparison of specialized features called minutiae. Minutiae are essentially of two equally frequent types - either the abrupt ending of a line in the middle of the fingerprint or the fusion of two lines to create a Y-shaped junction. Typically there are about 60 or 70 such features in a fingerprint and it is the relative location of these from each other that creates a unique spatial pattern that statistically no other human can possess.

Figure 5:
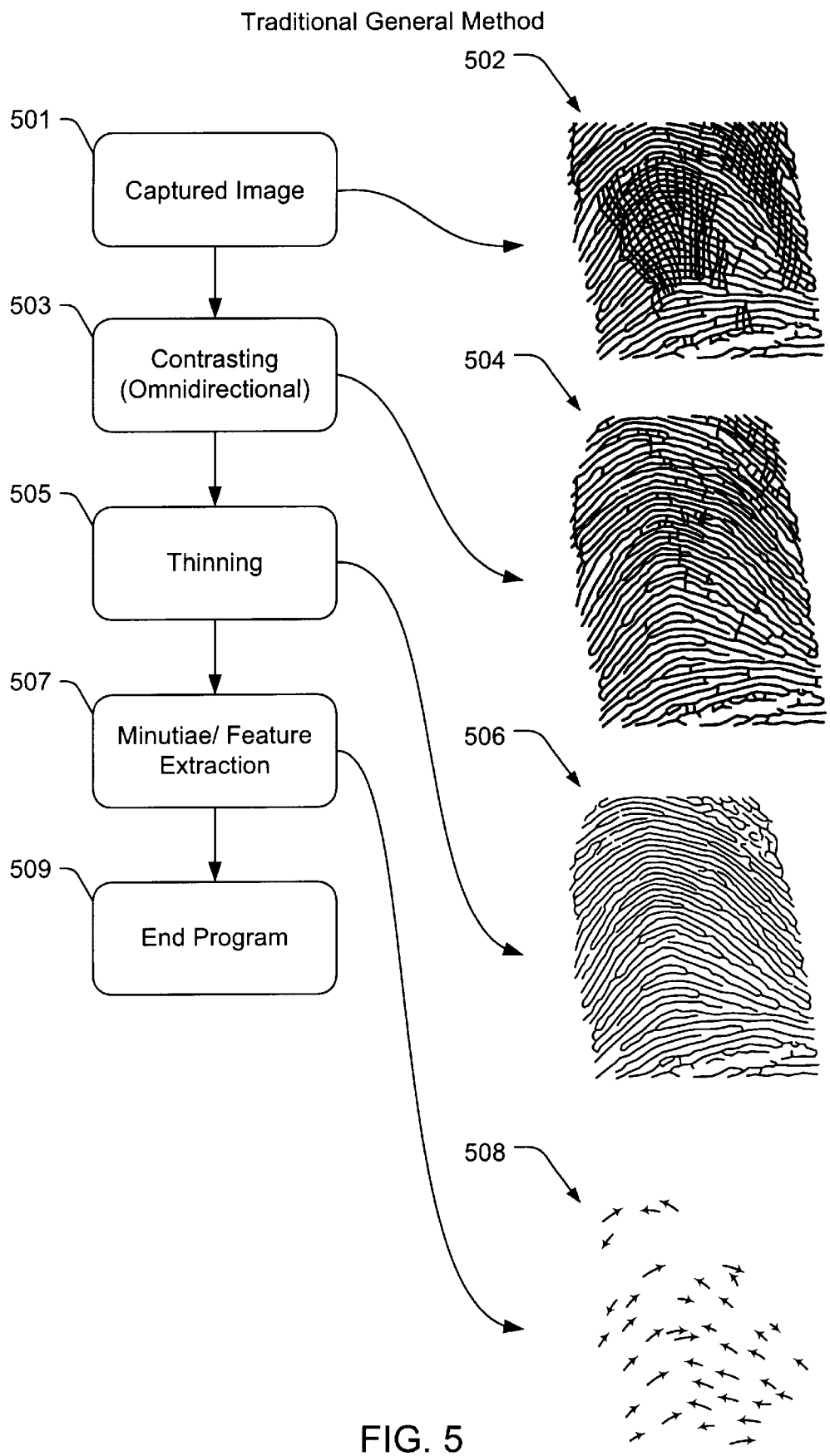
FIG. 5 is a flow diagram depicting a fingerprint matching technique that may be employed with the present invention.

Suitable methods of fingerprint matching may involve software processing steps as illustrated in FIG. 5. After capturing the fingerprint image (step 501), a contrasting algorithm (step 503) reduces all the gray shades of a captured image 502 to either black (for ridgelines) or white (for valley lines) as shown in image 504. Traditionally these algorithms are omni-directional. Basically, the particular shade of gray at each pixel is compared with those of the neighboring pixels in all directions and if judged to be relatively darker than most of its neighbors it is deemed to be black, otherwise white. After this contrasting step, the contrasted image 504 is further processed by a thinning algorithm (step 505). The object here is to reduce the black lines from being on average four pixels thick to only one pixel thick, thereby increasing the number of white pixels substantially. A thinned image 506 is then examined by further algorithms (step 507) that attempt to deduce and accurately extract the minutiae and their locations as shown in a map 508. The process is then completed at 509. All further fingerprint matching/comparison often relies primarily on these 60 or 70 extracted pieces of information.

Central authentication system (CAS) 106 is preferably, though not necessarily, provided as a server or other node connected to one or more MSCs over a public switched telephone network. CAS 106 may also have wireless connection to an MSC or may even form a part of the MSC. Generally, CAS 106 must be able to generate and compare challenges, access a database of fingerprint based tokens, and communicate with a plurality of wireless sources (e.g., mobile cellular telephones) via the one or more MSCs.

Figure 6:
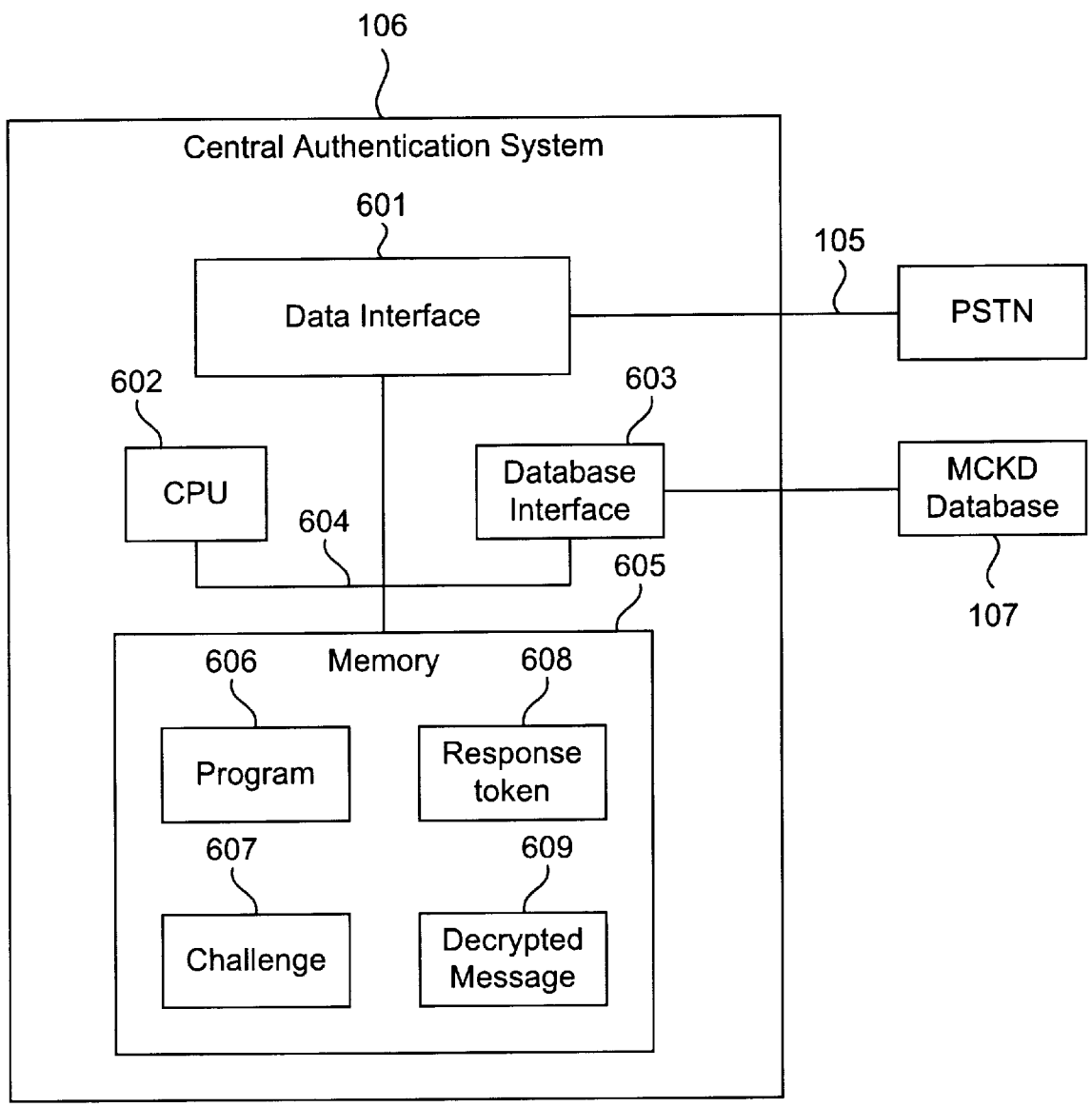
FIG. 6 is a block diagram of a central authentication system for processing biometric information from a mobile telephone in accordance with one embodiment of the present invention.

FIG. 6 is a diagram of CAS 106 in accordance with one embodiment of this invention. The design is superficially similar to the FCPD 101 (and the design presented in U.S. Pat. No. 5,420,908). Connected to CAS 106 are PSTN 105 and MCKD 107. CAS 106 must be able to handle, simultaneously, many calls from many wireless carriers. It includes a memory 605 including a persistently stored program 606 and various temporarily stored items including a challenge 607, a response token 608, and a decrypted message 609. Program 606 contains the instructions for generating a challenge, encrypting the challenge with a fingerprint based token, validating a decrypted challenge (e.g., by comparison with the generated challenge), fingerprint matching based on tokens, and, in some embodiments, comparing a response token with one or more stored tokens and further assuring that tokens are not identical as that would imply illegal use. Response token 608 is a memory entity containing the token sent back from the FCPD 101 in the wireless telephone 102 before token matching is conducted. When a new token is provided from FCPD, stored token is updated.

In addition, CAS 106 includes a CPU 602 for controlling the execution of a program 606, accessing memory 605, communicating with the MSCs over the PSTN. Communication over the PSTN is provided through a data interface 601 in CAS 106 which is connected to the PSTN over a line 105. In addition, CAS 106 communicates with MCKD database 107 through a database interface 603 as shown.

CPU 602, memory 605, database interface 603, and data interface 601 are communicate with one another over a data bus 604.

In a preferred embodiment, the initial registration of the phone-owner's fingerprint at the CAS 106 to create the appropriate entry into the MCKD 107 need not require the user to visit the central phone service provider. When the phone-owner purchases or rents the wireless phone at any local phone store he or she can use the FCPD 101 on the newly purchased wireless telephone 102 itself to activate registry at the CAS 106 via the common air interface and MSC 103. The phone's ESN and MIN can be sent along with the owner's fingerprint and placed in the CAS database for future use.

In yet another embodiment of the present invention, multiple users can be permitted to use the same wireless phone. All that is required is that the MCKD 107 at the CAS 106 be allowed to contain multiple CKs 202, one generated from each user of the same phone. Such authorization can in principle be activated/initiated by the phone owner serving as a master user who can at any time recruit additional users to be able to use their phone. By activating appropriate buttons on the phone, the master user can in principle activate the phone and the CAS 106 to receive a newly recruited user's fingerprint for association with the master user's entry in the MCKD 107. The master user can remotely authorize this action by simply validating it with his/her fingerprint. Again by engaging a pre-defined sequence of buttons on the phone the master user could also in principle remove previously authorized co-users.

In a further embodiment of the present invention, the phone owner could use more than one fingerprint as a means to authenticate his/her identity. The MCKD 107 can be arranged to contain information regarding more than one fingerprint of the owner. In fact, if additional password-like security beyond fingerprint security is desired, the owner can provide multiple fingerprints from different fingers in a particular secret order. This can serve as a "password" known only to the owner.

In one use of the current invention, the traditional MINs and ESNs associated with wireless phones are no longer required. The wireless telephone 102 will have an integrated FCPD 101. When a user dials a number, the number of the party being called and the token generated from the fingerprint of the user on the FCPD 101 will be sent to the MSC 103 and then forwarded to the CAS 106 for authentication based only on the fingerprint token of the user for billing and authorization purposes. Because each fingerprint token generated from the same finger will be different, a token intercepted from the common air interface can not easily be used for fraudulent use of wireless telephones. If a particular token generated from a fingerprint is captured illegally from the air interface and subsequently used repeatedly to authorize illegal calls, this can be detected very easily by the CAS 106 since it would in normal circumstances expect somewhat different and varied tokens being generated from the same fingerprint. Because such variations in the generated token are intrinsic to the way fingerprint information is distributed on the finger itself, these variations cannot be gleaned from illegally capturing one token common from the common air interface. That is, tokens generated from the same fingerprint at different impressions on the FCPD 101 will vary so that merely having illegally captured one of these variations will not enable the generation of varied tokens that are still meaningfully related to the original fingerprint. The only thing that can be done is to use the exact same illegally captured token to make illegal calls, but that can be easily detected. Thus it is possible that the systems of this invention can allow any user to use any wireless telephone to place calls.

In another use of the current invention, the identity of the user can be authenticated for the purpose of identifying the caller's personal identity rather than merely the phone number from the caller initiated the call—i.e. the source terminal-ID. In one embodiment of the present invention, at step 319 (FIG. 3), the caller's personal identity as determined by the CAS 106 can be made available to the call control entity or the recipient of the call. Based on the prior knowledge of who the caller is (and not just merely what phone number the caller is calling from) the call recipient may elect to block the call even after it has been authenticated as being non-fraudulent at step 314.

The current invention also provides a method for the identification of the caller (caller ID) originating the phone call. In recent years, caller ID technology (where the phone number of the caller's phone is automatically revealed to the call control entity or the recipient of the phone call in a manner that allows the recipient to screen his or her calls) has become increasingly commonplace. In effect, caller-ID as practiced today is really terminal-ID (the ID of the caller's phone) and not really the personal identity of the caller. With the present invention, wireless and traditional wired phones that have the built-in capacity to capture/compare fingerprint information and communicate with an MSC for authorization can allow the caller to be personally identified (rather than simply the caller's phone number) to the call control entity or the recipient for call screening or other authentication purposes. Indeed, both the caller-ID and the terminal-ID can be jointly authenticated for an even higher level of security in phone networks.

As mentioned, the technology described herein may be employed in contexts other than cellular telephone systems. For example, the invention may be employed to ensure secure access to a vehicle with a wireless security system. Many automobiles now employ wireless systems to allow remote control of door locking, automotive alarm systems, lighting, etc. within the automobile. When the owner approaches his or her car, he or she can unlock the car doors or activate/inactivate other car systems before actually reaching the car. This is accomplished with the click of a button on a wireless control module. Unfortunately, if such a module falls into the hands of a thief (or if the wireless signal is illegally captured through the air and decoded), he may be able to circumvent the car's security mechanism(s) and obtain control of the car. The present invention provides a mechanism to protect against this possibility.

Wireless car security systems of this invention may employ a wireless control module (source) containing the logic necessary for capturing and transmitting a token based upon a user's fingerprint. The logic may be contained within a module as described above with reference to FCPD 101. Generally, the vehicle itself may provide most of the functionality described above with reference to CAS 106. Of course, it need not provide access to a PSTN or database 107. However, it should include a finger print token of the car operator and possibly multiple recently received tokens so that access may be blocked if the token exactly matches a received token.

The vehicle protection mechanism of this invention may operate as follows. First, the system on board the vehicle determines that a request for access to the vehicle has been initiated from a wireless source. Next, the vehicle system determines whether the source fingerprint data provided at the wireless source matches stored fingerprint data provided for the vehicle. Access to the vehicle is then permitted (e.g., car doors are unlocked) if the source fingerprint data matches the stored fingerprint data. In some embodiments, the wireless source may prompt its user for a fingerprint from which to generate the source fingerprint data.

In especially preferred embodiments, a full challenge-response protocol as described above with reference to FIGS. 3A and 3B is employed. This may involve generating an encrypted challenge from a challenge and a token based on the fingerprint data stored with the automobile. Then; the encrypted challenge and the stored fingerprint token are sent to the source where the stored and source fingerprints are compared. If they match, one of the fingerprints is used to decrypt the encrypted challenged. The now decrypted challenge and the source fingerprint data are then sent back to the automobile where the decrypted challenge is confirmed and the source and stored fingerprints are again compared. If all tests are passed, access to the automobile is permitted.

While the present invention has been described in terms of a preferred embodiment and certain variations thereof, the scope should not be limited to the specifics presented above. For example, while the system of this invention has been described as including a central authentication system separated from a mobile switching center by a public switched telephone network, the invention may be implemented by providing the central authentication system within the mobile switching center. In this case, it may be necessary to provide a mechanism for regularly updating the authentication system at each mobile switching center. Further, the invention may be advantageously employed in systems that do not employ a secret key. Importantly, the invention may rely on biometric information other than fingerprints. Examples of such alternative biometric information include, but are not limited to, a user's voice, personal information, photograph, hand shape, and retina.

Many similar variations on the above-described preferred embodiment, may be employed. Therefore, the invention should be broadly interpreted with reference to the following claims.

What is claimed is:

1. A method for authenticating a call to be made over a communication system, the method comprising:
   (a) determining that the call has been initiated from a source;
   (b) encrypting a challenge with stored fingerprint minutiae data to produce an encrypted challenge;
   (c) sending the encrypted challenge to the source for the purpose of decrypting by the source with source fingerprint minutiae data from a user of the source;
   (d) determining whether source fingerprint minutiae data provided from said source matches said stored fingerprint minutiae data associated with said source; and
   (e) if said source fingerprint data matches said stored fingerprint data, allowing said call to be completed.

2. The method of claim 1, wherein the communication system forms at least part of a wireless telephone network.

3. The method of claim 2, wherein the call initiated from the source is forwarded through one or more a plurality of mobile switching centers.

4. The method of claim 2, wherein said source is a mobile cellular telephone.

5. The method of claim 4, wherein determining that a call is being initiated includes detecting transmission of at least one of a mobile identification number (MIN) and an electronic serial number (ESN) associated with the mobile cellular telephone.

6. The method of claim 5 further comprising confirming that said at least one of the MIN and the ESN is valid.

7. The method of claim 1, wherein said fingerprint data is provided in an interminutiae distance-vector-derived format.

8. The method of claim 1, further comprising:
   receiving a decrypted challenge from said source, which decrypted challenge has been decrypted with the source fingerprint data;
   comparing the challenge with the decrypted challenge from the source; and
   if the challenge and the decrypted challenge do not match, blocking the call.

9. The method of claim 1, further comprising:
   determining whether the source fingerprint minutiae data is identical to one or more instances of sample fingerprint minutiae data previously received; and
   if the source fingerprint minutiae data and any one of the instances of the sample fingerprint minutiae data are identical, preventing the call from being completed.

10. The method of claim 1, where the fingerprint data is provided in a timestamp.

11. A method for accessing a vehicle with a wireless security system, the method comprising:
   (a) determining that a request for access to the vehicle has been initiated from a wireless source;
   (b) determining whether source fingerprint data provided at said wireless source matches stored fingerprint data provided for the vehicle; and
   (c) if said source fingerprint data matches said stored fingerprint data, allowing access to the vehicle.

12. The method of claim 11, further comprising prompting a user of said wireless source for a fingerprint from which to generate the source fingerprint data.

13. The method of claim 11, wherein the stored fingerprint data is stored in the vehicle.

14. The method of claim 11, wherein the vehicle is a car and allowing access to the car comprises unlocking the car.

15. A method for authenticating a call to be made over a communication system, the method comprising:
   (a) sending a dialed number on said communication network;
   (b) receiving a challenge encrypted with stored fingerprint minutiae data and the stored fingerprint minutiae data itself from the communications system;
   (c) receiving a user's fingerprint;
   (d) generating source fingerprint minutiae data from said user's fingerprint;
   (e) comparing the stored fingerprint minutiae data with the source fingerprint minutiae data; and
   (f) if the stored and the source fingerprint minutiae data match, sending the source fingerprint minutiae data to the communications system.

16. The method of claim 15, wherein the communication system forms at least a part of a wireless telephone network.

17. The method of claim 16, wherein (a) through (f) are performed by a mobile cellular telephone.

18. The method of claim 15, further comprising:
   transmitting at least one of a MIN and an ESN to said switching center.

19. The method of claim 15, further comprising:
   prompting the user to provide a fingerprint.

20. The method of claim 15, wherein the stored fingerprint data is provided from a database on a public switched telephone network.

21. The method of claim 15, further comprising providing a timestamp with the source fingerprint data.

22. A wireless communication device capable of rendering wireless communications secure by requiring biometric information from a user, the device comprising:
   (a) a wireless communications interface for sending and receiving wireless communications;
   (b) a device for capturing the user's fingerprint; and
   (c) a processing device capable of converting the user's fingerprint to source minutiae fingerprint data which can be transmitted, wherein the processing device is also capable of comparing the source fingerprint minutiae data with stored fingerprint minutiae data received via the wireless communications interface and determining whether the source and stored fingerprint minutiae data match, whereby when the source and stored fingerprint data are found to match, the device decrypts a challenge encrypted with the stored fingerprint minutiae data and received via the wireless communications interface and then transmits the source fingerprint minutiae data via the wireless communications interface.

23. The device of claim 22, wherein the device is a wireless telephone.

24. The device of claim 23, wherein the wireless telephone includes a casing and provided within said casing are the device for capturing the user's fingerprint and the processing device.

25. The device of claim 22, wherein the wireless communications interface is capable of sending and receiving fingerprint data over a data channel which operates at a different frequency from a communications channel which sends and receives other communications.

26. The device of claim 22, wherein the device for capturing the user's fingerprint includes:
   a fingerprint capture surface on which the user can place his or her finger to produce an optical image of the user's fingerprint;
   an imager capable of generating an electronic image of the user's fingerprint; and
   optics for directing the optical image of the user's fingerprint from the finger print capture surface to the imager.

27. The device of claim 26, wherein the imager is selected from the group consisting of CCD arrays and CMOS photodiode/photogate arrays.

28. The device of claim 27, wherein the imager is a CMOS photodiode/photogate array which is provided on an integrated circuit together with the processing device.

29. The device of claim 22, wherein the device for capturing the user's fingerprint is a capacitor array formed on a semiconductor substrate or an ultrasonic mechanism formed on a semiconductor substrate.

30. The device of claim 22, wherein the processing device is a CPU.

31. A central authentication system connected to a communications network and capable of rendering wireless communications secure by processing biometric information from a user, the device comprising:
   (a) a communications interface for sending and receiving data communications over said communications network;
   (b) a database interface for accessing a database containing stored fingerprint minutiae data associated with users of wireless communications devices; and
   (c) a processor capable of determining whether a wireless communication from a wireless communications device should be permitted based upon a match between a user's fingerprint minutiae data taken from said wireless communications device and stored fingerprint minutiae data associated the wireless communications device, wherein the processor is capable of generating an encrypted challenge by encrypting a challenge with a token containing said stored fingerprint minutiae data.

32. The central authentication system of claim 31, wherein the communications interface is coupled to a public switched telephone network.

33. The central authentication system of claim 32, wherein the central authentication system communicates with one or more mobile switching centers via the public switched telephone network.

34. The central authentication system of claim 31, wherein the database includes, for at least one of said wireless communications devices, a plurality of received tokens containing information from fingerprints taken at said wireless communications device.

35. The central authentication system of claim 34, wherein the processor is capable of comparing the user's fingerprint minutiae data with said plurality of tokens for said given wireless communications device.

36. The central authentication system of claim 31, further comprising a memory which persistently stores a program allowing the processor to determine whether wireless communications from the wireless communications devices should be permitted.

37. The central authentication system of claim 36, wherein the memory can store a challenge and a decrypted challenge so that the processor can determine whether the challenge and the decrypted challenge match.

38. The method of claim 1, further comprising:
   determining whether the source fingerprint minutiae data is identical to the stored fingerprint minutiae data; and
   if the source fingerprint minutiae data and stored fingerprint minutiae data are identical, preventing the call from being completed.

39. The method of claim 38, further comprising:
   determining whether the source fingerprint minutiae data is identical to one or more instances of sample fingerprint minutiae data previously received; and
   if the source fingerprint minutiae data and any one of the instances of the sample fingerprint minutiae data are identical, preventing the call from being completed.

40. A method for authenticating a call to be made over a wireless communication system, the method comprising:
   (a) determining that the call has been initiated from a wireless source;
   (b) encrypting a challenge with stored fingerprint minutiae data to produce an encrypted challenge;
   (c) sending the encrypted challenge to the source for the purpose of decrypting by the source with source fingerprint minutiae data from a user of the source;
   (d) receiving a decrypted challenge from said source, which decrypted challenge has been decrypted with the source fingerprint data;
   (e) comparing the challenge with the decrypted challenge from the source; and
   (f) determining whether source fingerprint minutiae data provided from said source matches said stored fingerprint minutiae data associated with said source;
   (g) determining whether the source fingerprint minutiae data is identical to one or more instances of sample fingerprint minutiae data previously received or is identical to the stored fingerprint minutiae data; and (h) if the challenge and the decrypted challenge match, and if the source fingerprint data matches the stored fingerprint data, and if the source fingerprint minutiae data and no instances of the sample fingerprint minutiae data or the stored fingerprint minutiae data are identical, allowing the call from being completed.

41. A method for authenticating a call to be made over a communication system, the method comprising:

(a) sending a dialed number on said communication network;

(b) receiving from the communications system, stored fingerprint minutiae data and a challenge encrypted with the stored fingerprint minutiae data;

(c) receiving a user's fingerprint;

(d) generating source fingerprint minutiae data from said user's fingerprint;

(e) comparing the stored fingerprint minutiae data with the source fingerprint minutiae data;

(f) if the stored and the source fingerprint minutiae data match, decrypting the encrypted challenge with the source fingerprint minutiae data to produce a decrypted challenge; and (g) transmitting said decrypted challenge and the source fingerprint minutiae data to the communications system.

42. The wireless communication device of claim 22, wherein the processing device is further capable of decrypting a challenge received from said remote location, with the stored fingerprint minutiae data, when the source and stored fingerprint minutiae data are found to match.

43. The central authentication system of claim 31, wherein the processor is capable of comparing the user's fingerprint minutiae data with the stored fingerprint minutiae data, whereby when the stored fingerprint minutiae data matches the user's fingerprint minutiae data, the central authentication system can allow a call from the user to proceed.

* * * * *

UNITED STATES PATENT AND TRADEMARK OFFICE
CERTIFICATE OF CORRECTION

PATENT NO. : 6,219,793 B1
DATED : April 17, 2001
INVENTOR(S) : Li et al.

It is certified that error appears in the above-identified patent and that said Letters Patent is hereby corrected as shown below:

<u>Title page,</u>
Item [73], Assignee, please delete Hush, Inc., Menlo Park, CA (US)

Signed and Sealed this

Fifth Day of March, 2002

*Attest:*

JAMES E. ROGAN
*Director of the United States Patent and Trademark Office*

*Attesting Officer*